Nov. 9, 1943.　　　E. C. PHILLIPS　　　2,333,881
CULTIVATOR
Filed July 15, 1943　　　2 Sheets-Sheet 1

Inventor
Emil C. Phillips,
By McMorrow
Attorneys

Nov. 9, 1943.   E. C. PHILLIPS   2,333,881
CULTIVATOR
Filed July 15, 1943   2 Sheets-Sheet 2

Inventor
Emil C. Phillips,

Patented Nov. 9, 1943

2,333,881

UNITED STATES PATENT OFFICE 2,333,881

CULTIVATOR

Emil C. Phillips, Cape Girardeau, Mo.

Application July 15, 1943, Serial No. 494,830

2 Claims. (Cl. 97—98)

This invention relates to a cultivator especially adapted for cultivating row crops, and has for the primary object the provision of a straddle row gang type cultivator mountable on a tractor and operable rearwardly thereof and is of a construction whereby the gangs may be easily and quickly adjusted transversely of the tractor by the operator of the latter to compensate for side slip of the tractor when operating on hillsides or slopes and thereby prevent covering or plowing out of the crops and also greatly facilitate the cultivating operation on curves.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which Figure 1 is a fragmentary side elevation, partly in section, illustrating a portion of a tractor equipped with a cultivator constructed in accordance with my invention.

Figure 1:
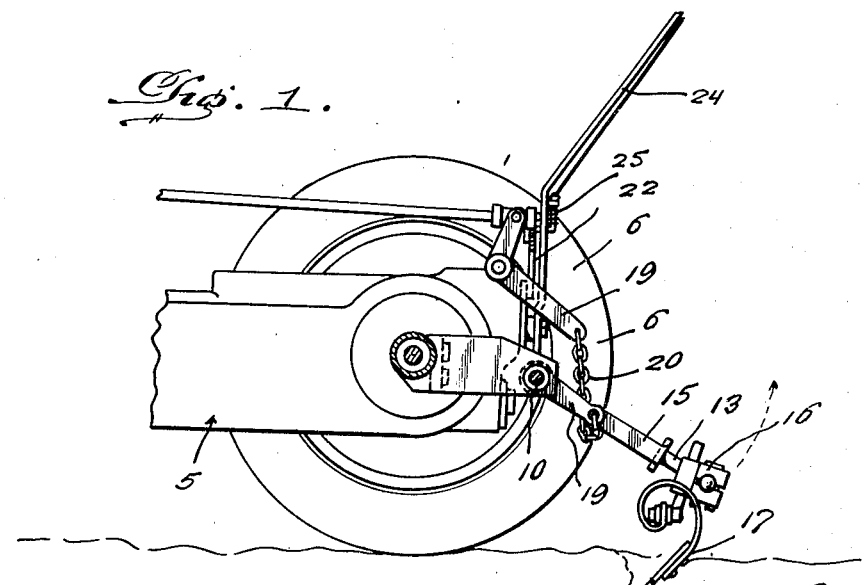
Figure 2:
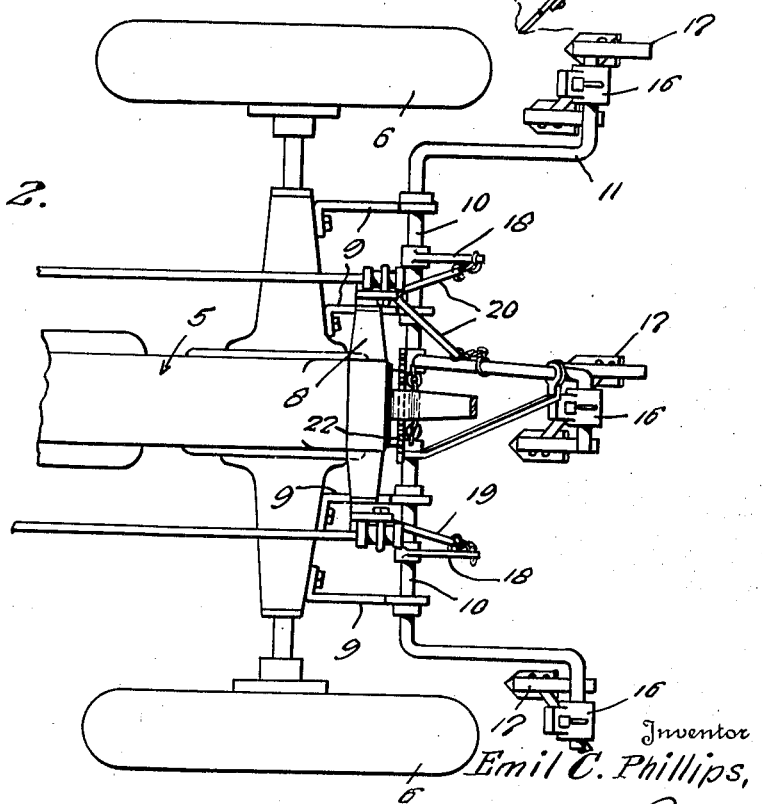
Figure 2 is a fragmentary top plan view illustrating the same.

Referring in detail to the drawings, the numeral 5 indicates a fragmentary portion of a tractor, 6 the drive or rear wheels thereof and 7 the rear axle housing. The tractor is equipped with a conventional type of hoist, a fragmentary portion thereof being indicated by the character 8.

In adapting the present invention to the tractor 5, pairs of brackets 9 are mounted on the rear face of the housing 7 and rotatably support shafts 10 each including a crank portion 11. The crank portions terminate in substantial alignment with the rear or drive wheels 6 of the tractor. The shafts are mounted for rotation and a limited sliding movement transversely of the tractor.

Figure 3:
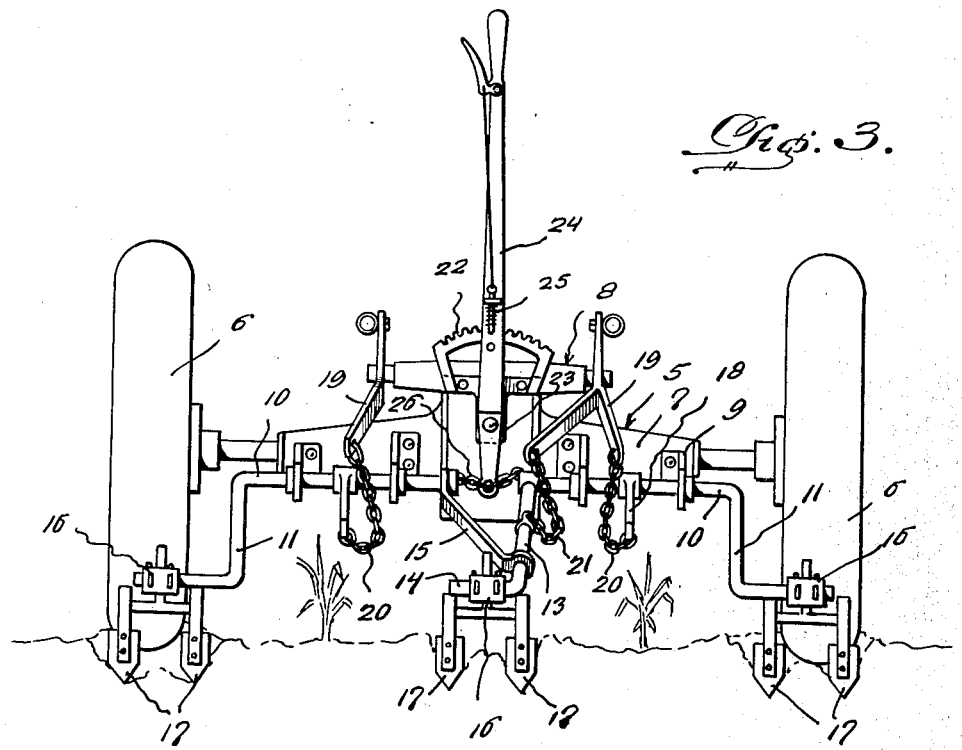
Figure 3 is a rear elevation illustrating the device applied to the tractor.
Figure 4:
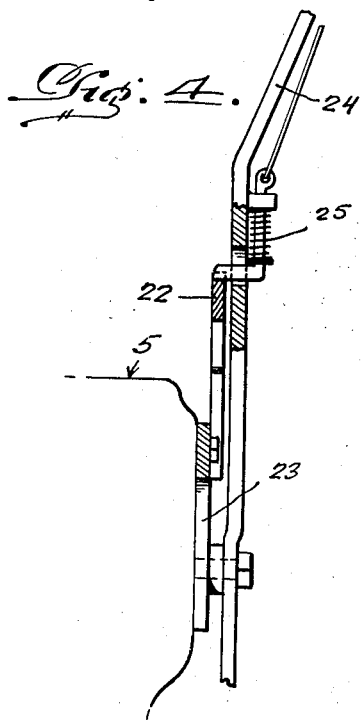
Figure 4 is a fragmentary longitudinal sectional view illustrating the control lever for shifting the position of the gangs of the cultivator.
Figure 5:
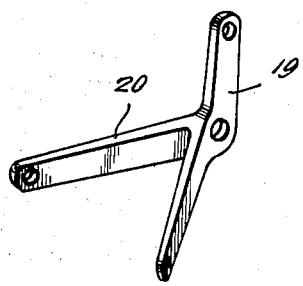
Figure 5 is a perspective view illustrating one of the arms adaptable to the tractor for raising and lowering the cultivator.

An arm 13 is secured to one end of one of the shafts and has a right angularly disposed portion 14 arranged substantially in alignment with the longitudinal axis of the tractor. The other shaft has secured thereto an arm 15 apertured to receive the arm 13, thereby connecting the shafts together. The crank portions 11 and the portion 14 of the arm 13 have mounted thereon clevises 16 for connecting thereto cultivating elements or shovels 17 of a conventional construction. The cultivating elements or shovels are grouped in pairs, as clearly shown in Figure 3. The clevises 16 permit the pairs of shovel elements to be adjusted transversely of their support.

Arms 18 are secured to the shafts 10 and are connected to bell crank levers 19 secured to the hoist device 8 of the tractor, one of the bell crank levers including diverging portions 20. The diverging portions 20 of one of the bell crank levers and the other bell crank lever are connected to the arms 18 by flexible elements 20 while the other diverging portions of one of the bell crank levers are connected to the arm 13 by a flexible element 21. This construction permits the operator of the tractor through the manipulation of the hoist mechanism, to raise and lower the cultivating shovels with respect to the ground.

A quadrant 22 is mounted on the rear axle housing 7 and includes an extension 23 to which is pivotally mounted a control lever 24 having a detent 25 cooperating with the quadrant in releasably securing the control lever in different positions.

The control lever is located directly behind the operator's seat of the tractor so as to be within convenient reach of the operator whereby the lever may be swung in either direction. The lower end of the lever is connected to the adjacent ends of the shafts 10 by flexible elements 26. This construction permits the operator to easily and quickly adjust the shovel or cultivating elements transversely of the tractor for the purpose of compensating for side slip of the tractor when operating on slopes or hillsides to prevent covering or plowing out of the crops and also to facilitate the cultivating of the crops on curves. The movement of the control lever in one direction will cause the cultivator elements to be shifted transversely in one direction and a reverse pivotal movement will cause the cultivating elements to be shifted transversely of the tractor in an opposite direction.

The control for the cultivator permits the adjustments described to be easily carried out while the tractor is in motion.

While I have shown and described the preferred embodiment of my invention, it will be understood that minor changes in construction, combination and arrangement of parts may be made without departing from the spirit and scope of the invention as claimed.

Having thus described my invention, what I claim is:

1. In a cultivator, shafts arranged transversely and rearwardly of a tractor, means for rotatably and slidably mounting the shafts on the tractor, said shafts including crank portions terminating rearwardly of and substantially in alignment with traction wheels of the tractor, connected arms secured to said shafts, cultivating elements mounted on the crank portions and the connected arms, and means for connecting the shafts to a hoist mechanism of the tractor, and a control mechanism carried by the tractor and connected to said shafts for shifting thereof transversely of the tractor.

2. In a cultivator, shafts arranged transversely and rearwardly of a tractor, a hoist mechanism on the tractor, means for rotatably and slidably mounting the shafts on the tractor, said shafts including crank portions terminating rearwardly of and in substantial alignment with traction wheels of the tractor, arms connected to said shafts and to each other, cultivating elements carried by the crank portions and one of said arms, a quadrant, means for mounting the quadrant on the tractor, a control lever pivotally supported by the quadrant and connected to the shafts and including a detent for coacting with the quadrant whereby the shafts may be shifted transversely of the tractor, and means for connecting the shafts to the hoist mechanism of the tractor.

EMIL C. PHILLIPS.